United States Patent
Amulu et al.

(10) Patent No.: US 11,144,383 B2
(45) Date of Patent: Oct. 12, 2021

(54) PLATFORM FOR AUTOMATED ADMINISTRATION AND MONITORING OF IN-MEMORY SYSTEMS

(71) Applicant: SAP SE, Walldorf (DE)

(72) Inventors: James Michael Amulu, Chennai (IN); Biddappa C K, Bangalore (IN); Deepak Kaluti, Bangalore (IN); Vishnu Vijayakrishnan, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/813,934

(22) Filed: Mar. 10, 2020

(65) Prior Publication Data
US 2021/0286666 A1 Sep. 16, 2021

(51) Int. Cl.
| | |
|---|---|
| *G06F 11/00* | (2006.01) |
| *G06F 11/07* | (2006.01) |
| *G06F 11/34* | (2006.01) |
| *G06F 11/16* | (2006.01) |
| *G06F 16/21* | (2019.01) |

(52) U.S. Cl.
CPC ...... *G06F 11/0793* (2013.01); *G06F 11/0709* (2013.01); *G06F 11/0751* (2013.01); *G06F 11/0766* (2013.01); *G06F 11/16* (2013.01); *G06F 11/3409* (2013.01); *G06F 16/21* (2019.01)

(58) Field of Classification Search
CPC ............ G06F 11/0751; G06F 11/0793; G06F 11/0766; G06F 11/0709; G06F 11/3409; G06F 16/21
See application file for complete search history.

(56) References Cited

U.S. PATENT DOCUMENTS

| | | | |
|---|---|---|---|
| 8,489,923 B1 * | 7/2013 | Lakshminarayanan | H04L 12/2812 714/26 |
| 10,579,459 B2 * | 3/2020 | Bacha | G06F 11/3447 |
| 10,698,770 B1 * | 6/2020 | Kancharla | G06F 9/5016 |
| 10,776,193 B1 * | 9/2020 | Karpagavinayagam | G06F 11/1441 |

(Continued)

OTHER PUBLICATIONS

U.S. Appl. No. 16/220,044, Tv et al., Automated Summarized View of Multi-Dimensional Object in Enterprise Data Warehousing Systems, filed Dec. 14, 2018, 24 pages.

(Continued)

*Primary Examiner* — Jonathan D Gibson
(74) *Attorney, Agent, or Firm* — Fish & Richardson P.C.

(57) ABSTRACT

Methods, systems, and computer-readable storage media for receiving, by an auto-pilot platform, one or more log files from an in-memory system, determining, by the auto-pilot platform, occurrence of a first error within the in-memory system based on the one or more logs, wherein the first error is indicated by a first error code within the one or more log files, identifying, by the auto-pilot platform, a first resolution from a resolution repository based on the first error code, the resolution repository including one or more mappings associating error codes to resolutions including associating the first error code with the first resolution, initiating, by the auto-pilot platform, execution of the first resolution, and updating, by the auto-pilot platform, the resolution repository based on execution of the first resolution.

20 Claims, 6 Drawing Sheets

(56) References Cited

U.S. PATENT DOCUMENTS

| | | |
|---|---|---|
| 2013/0339801 A1* | 12/2013 | Ramaiah ............ G06F 11/3476 |
| | | 714/45 |
| 2014/0123099 A1 | 5/2014 | Amulu |
| 2014/0130008 A1 | 5/2014 | Amulu |
| 2014/0143270 A1 | 5/2014 | Amulu et al. |
| 2014/0149093 A1 | 5/2014 | Amulu |
| 2014/0181154 A1 | 6/2014 | Amulu et al. |
| 2016/0224401 A1* | 8/2016 | Adinarayan ........ G06F 11/0793 |
| 2017/0097861 A1* | 4/2017 | Claypool, III ........ G06F 11/079 |
| 2017/0102978 A1* | 4/2017 | Pallath ................ G06F 11/0787 |
| 2017/0228273 A1 | 8/2017 | Bikumala |
| 2017/0277466 A1* | 9/2017 | Weld .................... G06F 9/5016 |
| 2018/0150342 A1* | 5/2018 | Shridhar ............. G06F 11/3409 |
| 2018/0157544 A1* | 6/2018 | Brown ................ G06F 11/0793 |
| 2019/0087251 A1 | 3/2019 | Purushothaman |
| 2020/0012553 A1* | 1/2020 | Subhedar ............ G06F 11/0793 |
| 2021/0049063 A1* | 2/2021 | Reed ................... G06F 11/0709 |

OTHER PUBLICATIONS

U.S. Appl. No. 16/726,462, Amulu et al., Platform for Conversation-Based Insight Search in Analytics Systems, filed Dec. 24, 2019, 34 pages.

Extended European Search Report issued in European Appln. No. 21159263.9, dated Aug. 5, 2021, 9 pages.

* cited by examiner

PLATFORM FOR AUTOMATED ADMINISTRATION AND MONITORING OF IN-MEMORY SYSTEMS

BACKGROUND

In-memory systems can include in-memory platforms and database systems that are stored in and executed from main memory of one or more computing devices. For example, an in-memory database system can be described as a database management system that uses main memory for data storage. In-memory systems are administered and monitored for proper operation and/or any issues that may arise, such that resolutions can be implemented as needed.

However, traditional systems for administering and monitoring in-memory systems are reactive in nature and require significant manual effort of users (e.g., administrator users looking for and responding to alerts and errors). Further, traditional systems for administering and monitoring in-memory systems are reliant on the individual expertise of respective users (e.g., the expertise and domain knowledge of administrative users in recognizing issues and resolutions that can be executed to resolve the issues). Also, traditional systems for administering and monitoring in-memory systems do not support optimization of resources as scale increases (e.g., increased number of application instances executing within the in-memory system), often requiring resources to be added as scale increases.

SUMMARY

Implementations of the present disclosure are directed to a platform for automated administration and monitoring of in-memory database systems. More particularly, the platform of the present disclosure provides configurations to enable automated administration and monitoring of in-memory systems and provide auditable traceability of the tasks performed.

In some implementations, actions include receiving, by an auto-pilot platform, one or more log files from an in-memory system, determining, by the auto-pilot platform, occurrence of a first error within the in-memory system based on the one or more logs, wherein the first error is indicated by a first error code within the one or more log files, identifying, by the auto-pilot platform, a first resolution from a resolution repository based on the first error code, the resolution repository including one or more mappings associating error codes to resolutions including associating the first error code with the first resolution, initiating, by the auto-pilot platform, execution of the first resolution, and updating, by the auto-pilot platform, the resolution repository based on execution of the first resolution. Other implementations of this aspect include corresponding systems, apparatus, and computer programs, configured to perform the actions of the methods, encoded on computer storage devices.

These and other implementations can each optionally include one or more of the following features: determining, by the auto-pilot platform, occurrence of a first error within the in-memory system based on the one or more logs includes cross-referencing the first error code with a list of error codes and determining that the first error code is included in the list of error codes; updating the resolution repository based on execution of the first resolution occurs in response to the first resolution successfully resolving the first error and at least partially includes incrementing a frequency representing a number of time the first resolution has resolved errors; the first resolution is identified from a plurality of resolutions as a best-fit resolution for the first error in response to determining one or more of: a frequency associated with the first resolution being greater than frequencies of one or more other resolutions in the plurality of resolutions, and a last execution time of the first resolution being more recent than respective last execution times of the one or more other resolutions in the plurality of resolutions; actions further include determining, by the auto-pilot platform, occurrence of a second error within the in-memory system based on the one or more logs, wherein the second error is indicated by a second error code within the one or more log files, identifying, by the auto-pilot platform, a second resolution from the resolution repository based on the second error code, initiating, by the auto-pilot platform, execution of the second resolution, and determining, by the auto-pilot platform, that the second resolution is unsuccessful, and in response, initiating a support ticket for manual intervention in resolving the second error; actions further include updating the resolution repository to include a third resolution, the third resolution being executed to resolve the second issue in response to the support ticket; and the in-memory system includes an in-memory database system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a platform for automated administration and monitoring of in-memory database systems. More particularly, the platform of the present disclosure provides configurations to enable automated administration and monitoring of in-memory systems and provide auditable traceability of the tasks performed. Implementations can include actions of receiving, by an auto-pilot platform, one or more log files from an in-memory system, determining, by the auto-pilot platform, occurrence of a first error within the in-memory system based on the one or more logs, wherein the first error is indicated by a first error code within the one or more log files, identifying, by the auto-pilot platform, a first resolution from a resolution repository based on the first error code, the resolution repository including one or more mappings associating error codes to resolutions including associating the first error code with the first resolution, initiating, by the auto-pilot platform, execution of the first resolution, and updating, by the auto-pilot platform, the resolution repository based on execution of the first resolution To provide further context for implementations of the present disclosure, and as introduced above, in-memory systems can include in-memory platforms and database systems that are stored in and executed from main memory of one or more computing devices. For example, an in-memory database system can be described as a database management system that uses main memory for data storage. In-memory systems are administered and monitored for proper operation and/or any issues that may arise, such that resolutions can be implemented as needed. However, traditional systems for administering and monitoring in-memory systems are reactive in nature and require significant manual effort of users (e.g., administrator users looking for and responding to alerts and errors). This reactive and manual approach can suffice for a handful of manageable size of instances executing within the in-memory platform, and in cases where the service levels are not contractually bound (e.g., through service level agreements (SLAs)). Further, traditional systems for administering and monitoring in-memory systems are reliant on the individual expertise of respective users (e.g., the expertise and domain knowledge of administrative users in recognizing issues and resolutions that can be executed to resolve the issues). Also, traditional systems for administering and monitoring in-memory systems do not support optimization of resources as scale increases (e.g., increased number of application instances executing within the in-memory system), often requiring resources to be added as scale increases.

To provide further context, with the advent of enterprise cloud environments, hybrid on-premise and cloud environments and multi-cloud environments, as well as an exponential growth in the number of instances (e.g., application instances) executing within any particular environment, the task of administering and monitoring instances becomes burdened. That is, it is increasingly more difficult and less effective to administer and monitor in-memory systems deployed to these environments. Atomized activities are carried out by vendors just to manage day-to-day routines (e.g., backups, alerts, security breaches). Traditional approaches support administration/monitoring tasks at an instance level using studio-type tools installed at a client-side or a cockpit installed at a server-side. Other tools include browser-based tools. But the problem remains that these solutions are reactive in nature and human intervention is consistently required, even for a known problem and resolution scenario.

By way of example, a known issue with a known resolution for X instances can require a considerable amount of attention from one or more administrators. This can limit the number of instances that can be scaled up, because a balance has to be achieved with resources to attend to issues arising with increasing numbers of instances. For example, cloud environments support large volumes of instances, but SLAs can be a challenge to meet using traditional approaches.

In view of the above context, implementations of the present disclosure provide a platform for automated administration and monitoring of in-memory systems. More particularly, and as described in further detail herein, the platform of the present disclosure provides configurations to enable automated administration and monitoring of in-memory systems and provide auditable traceability of the tasks performed. The platform of the present disclosure is referred to as an in-memory system autopilot platform, or autopilot platform for short. In some implementations, the platform provides for Failure, Effect, Mode and Analysis (FEMA) models and troubleshooting guides (TSGs), collectively referred to as a resolution repository. As a whole, the platform of the present disclosure addresses the reactive nature and the human variability that plague traditional approaches and provide best-fit resolutions to proactively address issues. Further, as new resolutions are published, they are added to the platform. In some implementations, the platform detects and is configured to address outliers (e.g., previously unseen issues). In general, and as described in further detail herein, the platform of the present disclosure is based on processes of configuration, detection, intervention, qualification, understanding, remediation, backfilling, learning, improvising, and reporting tasks in an iterative manner.

Implementations of the present disclosure are described in further detail with reference to an example in-memory system, which includes an in-memory database system. A non-limiting example of an in-memory database system, which is referred to herein for purposes of illustration, includes SAP HANA provided by SAP SE of Walldorf, Germany. It is contemplated, however, that implementations of the present disclosure can be realized in any appropriate in-memory system. Further, implementations of the present disclosure can be realized in either on-premise deployment of the in-memory system, cloud-based deployment of the in-memory system, or hybrid deployment of the in-memory system.

Figure 1:
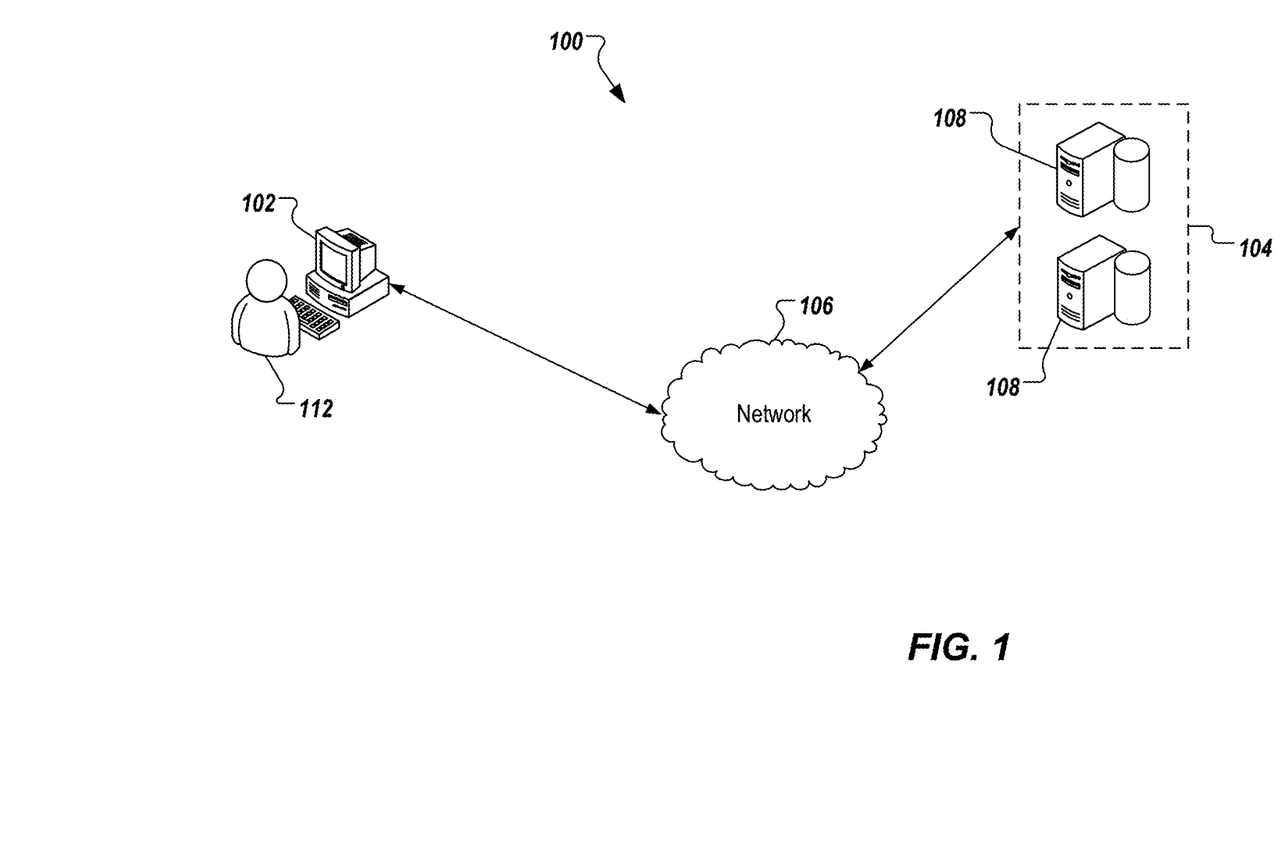
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to, a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an in-memory database system (e.g., SAP HANA). In some examples, an in-memory database system is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

In accordance with implementations of the present disclosure, an in-memory system autopilot platform for automated administration and monitoring of in-memory systems is executed within the example architecture 100. For example, the autopilot platform, or at least a portion thereof, can be hosted by the server system 104. As another example, the autopilot platform, or at least a portion thereof can be hosted by one or more other server systems (not depicted in FIG. 1).

Figure 2:
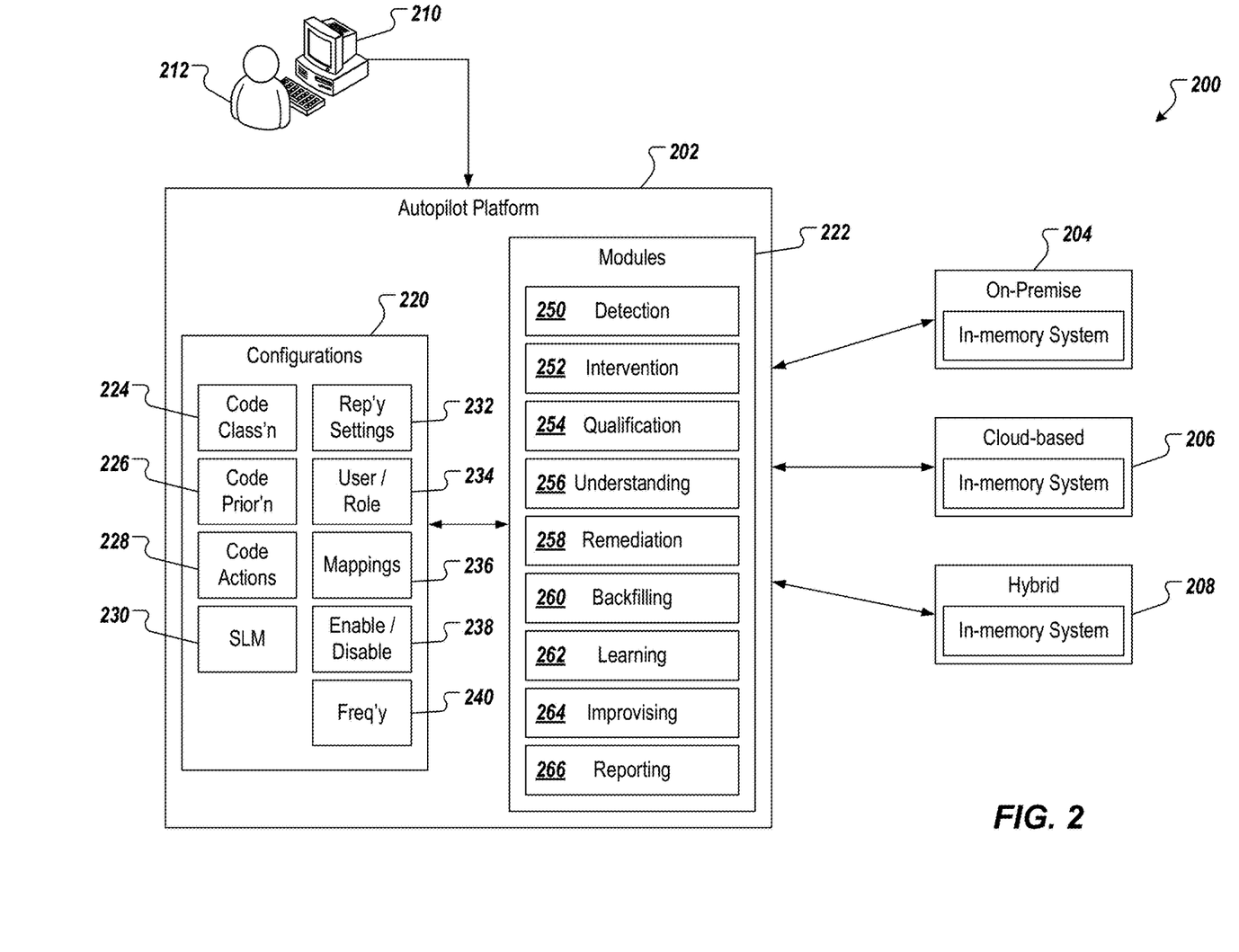
FIG. 2 depicts a conceptual architecture including a platform for automated administration and monitoring of in-memory systems in accordance with implementations of the present disclosure.

FIG. 2 depicts an example conceptual architecture 200 of an on-premise deployment of an in-memory database system. In the depicted example, the conceptual architecture 200 includes an autopilot platform 202 that is used for automated administration and monitoring of an on-premise environment 204, a cloud environment 206, and a hybrid environment 208. In some examples, each of the environments 204, 206, 208 execute one or more instances of an in-memory system (e.g., an in-memory database system). In some examples, an instance can be described as an instantiation of an in-memory system within an environment. Each environment can include multiple instances of in-memory systems. In some implementations, the autopilot platform 202 can be configured for automated administration and monitoring of the in-memory systems. In some examples, and as described in further detail herein, a configuration is provided for each in-memory system. For example, configuration settings can be provided through a computing device 210 by a user 212 (e.g., administrator). The autopilot platform 202 performed administrative and monitoring, as described herein, and can provide reporting on activities (e.g., reports sent to and displayed on the computing device 210).

In the example of FIG. 2, the autopilot 202 includes configurations 220 and modules 222. The configurations include code classifications 224 (e.g., error code classifications, warning code classifications, alert code classifications), error code prioritizations 226 (e.g., prioritizing a first error code relative to a second error code), code actions 228, a source location maintenance (SLM) 230, repository settings 232, user and role settings 234, mappings 236 (e.g., FEMA mappings, TSG mappings), enable/disable settings 238, and frequency settings 240 (e.g., setting indicating a frequency for monitoring the in-memory system). In some examples, each code can be classified into a classification, which is recorded in the code classifications 224. Example classifications can include, without limitation, persistence, back-up, high availability, disaster recovery, security, and auditing. In some examples, the source location maintenance 230 defines sources of data that are to be accessed for monitoring. Example data includes, without limitation, traces, logs, alerts, and telemetry data. For example, the source location maintenance 230 can include a uniform resource locator (URL) identifying a respective file (e.g., log file) for reading data therefrom.

In the example of FIG. 2, the modules 222 include a detection module 250, an intervention module 252, a qualification module 254, an understanding module 256, a remediation module 258, a backfilling module 260, a learning module 262, an improvising module 264, and a reporting module 266. Although the modules 222 are depicted as individual modules, it is contemplated that the modules can be provided in any appropriate combination. For example, the intervention module 252, the qualification module 254, the understanding module 256, and the remediation module 258 can each be provided as a sub-module of the detection module 250.

In some implementations, a configuration is provided within the configurations 220 for each in-memory system. For each instance of the in-memory system, the respective configuration is applied by the autopilot platform 202 for automated administration and monitoring. For example, the user 212 can provide input to the computing device 210, the input defining configuration settings that are to be applied to instances of a respective in-memory system. In some examples, each in-memory system can be assigned a universally unique identifier (UUID) that is associated with the configuration to be applied to the in-memory system. In this manner, upon instantiation of an instance of the in-memory system within one of the environments 204, 206, 208, the configuration can be retrieved based on the UUID for automated administration and monitoring of the instance of the in-memory system.

In response to instantiation of an in-memory system, the autopilot platform 202 begins monitoring of the instance of the in-memory platform. For example, the detection module 250 receives data from the in-memory system, determines whether an issue that is to be addressed has occurred, and if so, implements resolution of the issue.

Figure 3:
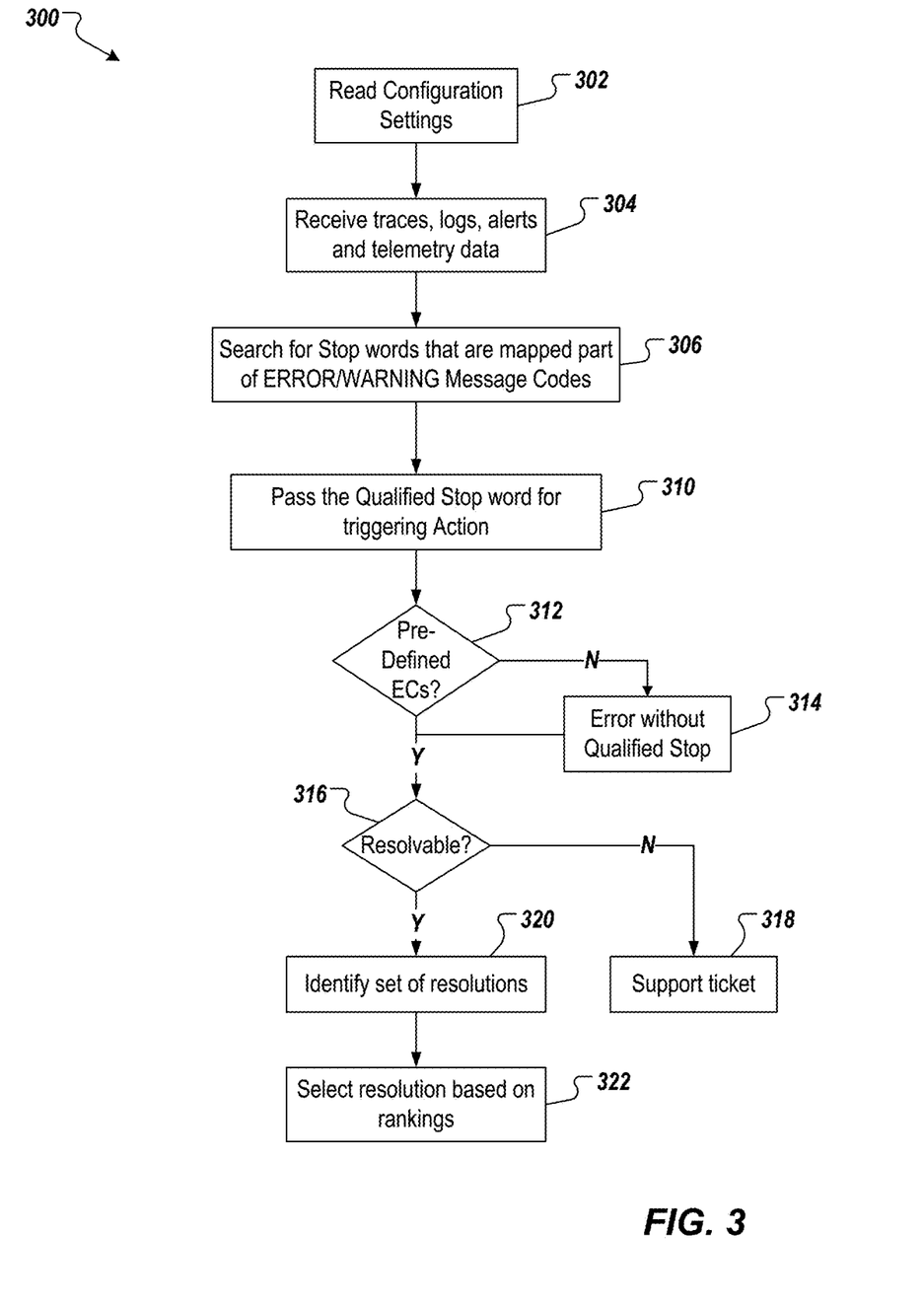
FIGS. 3-5 depict example processes that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices. For example, at least a portion of the example process 300 is executed by the detection module 250.

Configuration settings are read (302). For example, the detection module 250 reads at least a portion of the configurations 220, such as the source location maintenance 230, which indicates the data sources, from which data representative of operation of the in-memory system is stored. Data is received (304). For example, the detection module 250 retrieves one or more files from data sources indicated in the source location maintenance 230. Example data includes, without limitation, traces, logs, alerts, and telemetry data. Stop words are sought (306). For example, the detection module 250 processes the data to identify one or more stop words that are mapped to one or more message codes (e.g., error codes, warning codes, alert codes). This includes message codes that are provided for in the configuration 220.

A qualified stop word is provided for triggering action (310). In some examples, the detection module 250 identifies a qualified stop word within the message codes and provides the qualified stop word to initiate action (e.g., remediation). It is determined whether the stop word is associated with pre-defined error codes (312). If the stop word is not associated with pre-defined error codes, it is determined that an issue has occurred that is not associated with the qualified stop word 314. It is determined whether the issue is resolvable (316). For example, and as described in further detail herein, it is determined whether one or more resolutions are already provided for resolving the issue. If the issue is not resolvable, a support ticket is triggered (318). In some examples, the error codes are provided as content for the support ticket. If the issue is resolvable, a set of resolutions are identified (320), and a resolution is selected from the set of resolutions and is executed (322).

In some implementations, resolution is provided for qualified error codes. In some examples, a qualified error code is an error code, for which at least one resolution already exists. In some examples, the error code is used to query and search for known resolutions (e.g., available in FEMAs and/or TSGs). In some examples, if multiple resolutions are identified, a best-fit resolution is selected from the multiple resolutions. In some examples, a resolution can be distinguished as a best-fit resolution based on a date associated with each resolution and/or a frequency of use of each resolution. In some examples, more recently, more frequently used resolutions are determined to be the best-fit resolution.

Figure 4:
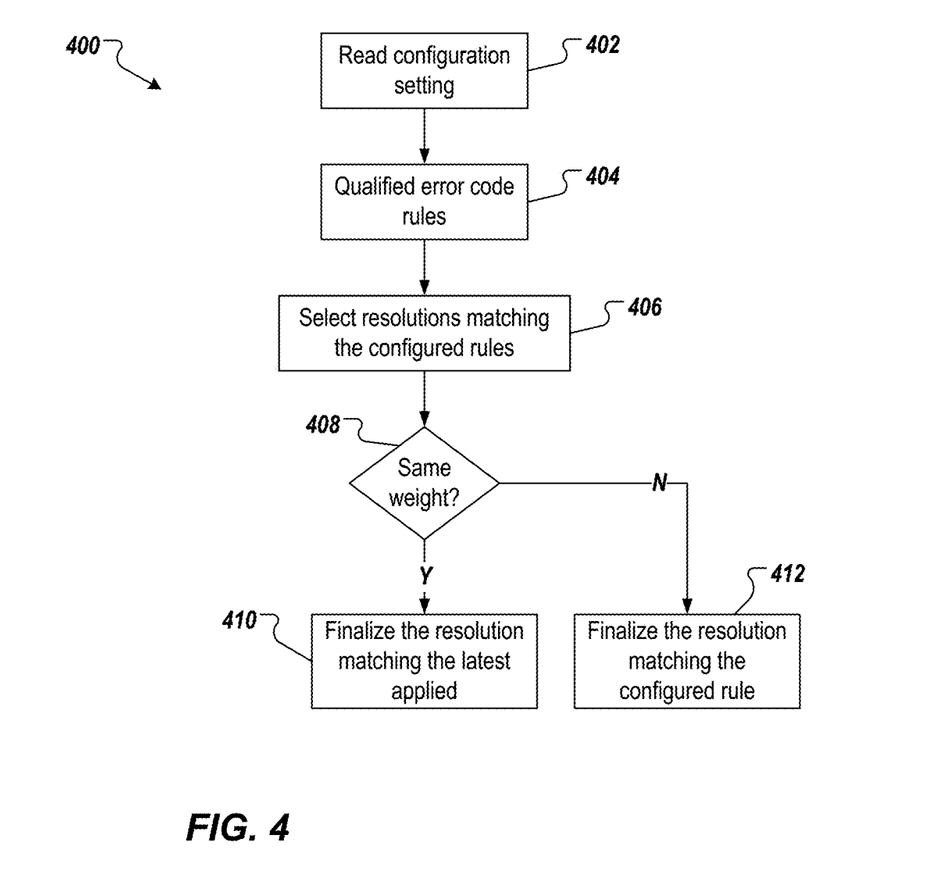

FIG. 4 depicts an example process 400 that can be executed in accordance with implementations of the present disclosure. In some examples, the example process 400 is provided using one or more computer-executable programs executed by one or more computing devices. For example, at least a portion of the example process 400 is executed by the detection module 250 (and/or the qualification module 254).

Configuration settings are read (402). For example, the detection module 250 reads at least a portion of the configurations 220, such as the mappings 234, which map error codes to resolutions within the resolution repository. One or more qualified error code rules are determined (404). For example, the one or more qualified error code rules are determined from the mappings. For each error code, a resolution associated with the error code is determined (406). For example, the error code (or an identifier uniquely identifying the error code) can be used to index a list of resolutions, each resolution being associated with one or more error codes. If a single resolution is provided for the error code, that resolution is instantiated for resolving the issue underlying the error code. If multiple resolutions are provided, a frequency of each resolution is determined as respective weights (408). In some examples, the frequency indicates a number of times that the resolution has been used in the past. In some examples, if multiple resolutions each of the highest frequency, the most recently used resolution is selected (410). In some examples, the resolution having the highest frequency is selected for resolving the issue underlying the error code (412).

In some implementations, an understanding process (e.g., executed by the understanding module 246) for planning execution of the resolution is executed. In some examples, a severity of the issue and a set of resolution requirements are provided. The severity can range from low severity (e.g., warning) to high severity (e.g., cessation of functionality). In some examples, the set of resolution requirements includes one or more parameters representative of executing the resolution. Example parameters can include, without limitation, whether the resolution is a hot-fix (e.g., fix is implemented while the system is running), downtime required to implement the resolution, version requirement for implementing the resolution, and the like. Based on this information, execution of the resolution is planned. In some examples, execution of the resolution can be based on downtime required, and the resolution is planned for a scheduled downtime of the in-memory system that is longer than the downtime required to implement the resolution. However, severity can play a role. For example, if the issue is of the highest severity, the resolution can be implemented immediately, as opposed to waiting to occur during a scheduled downtime of the in-memory system.

Figure 5:
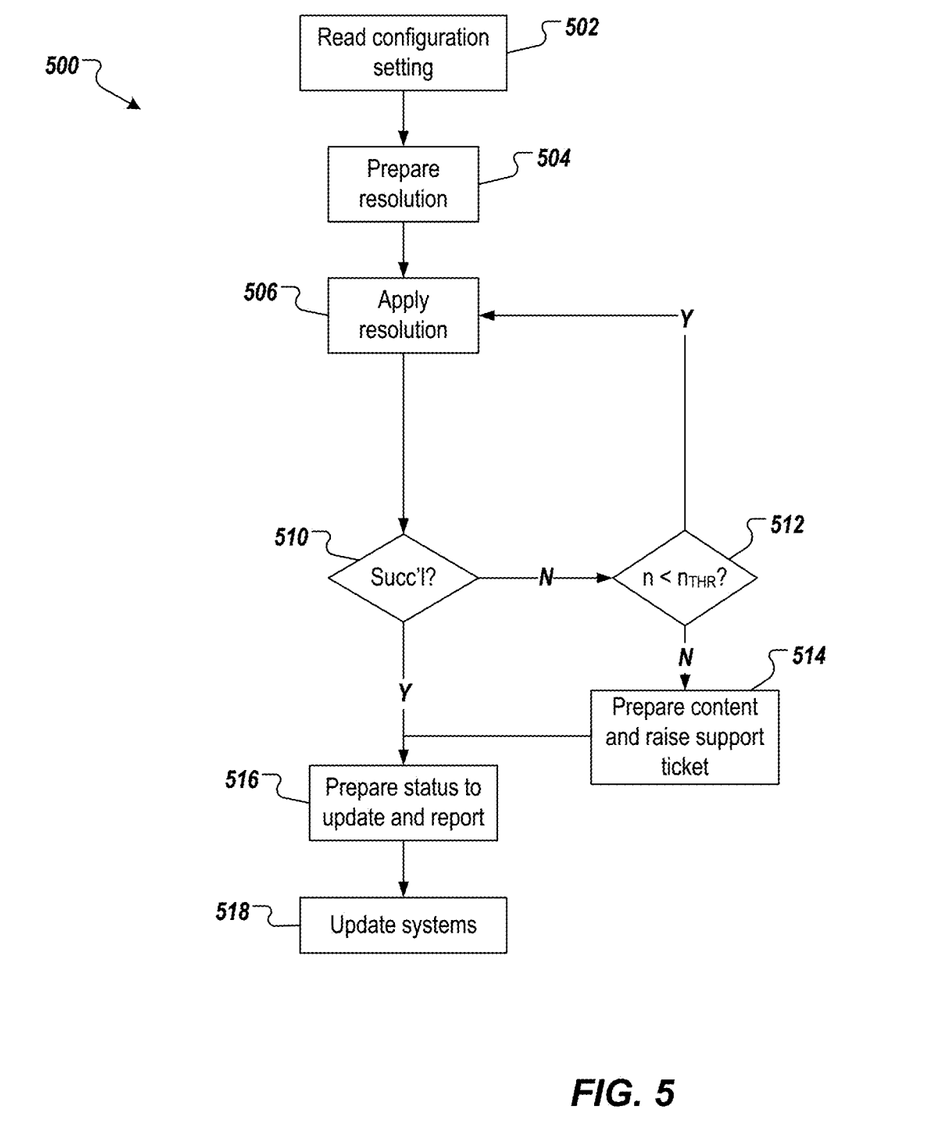

FIG. 5 depicts an example process 500 that can be executed in accordance with implementations of the present disclosure. In some examples, the example process 500 is provided using one or more computer-executable programs executed by one or more computing devices. For example, at least a portion of the example process 500 is executed by the detection module 250 (and/or the remediation module 248).

Configuration settings are read (502). For example, the detection module 250 reads at least a portion of the configurations 220. The resolution is prepared (504). For example, the selected resolution is scheduled for execution. The resolution is applied (506). For example, at the scheduled time, the resolution is applied as appropriate (e.g., as a hot-fix to computer-executable code that triggered the error). It is determined whether the resolution was successfully applied (510). If the resolution was not successfully applied, it is determined whether a number of attempts n is less than a threshold number of attempts nTHR (512). If the number of attempts n is less than a threshold number of attempts nTHR, the example process 500 loops back to try another attempt. If the number of attempts n is less than a threshold number of attempts nTHR, content for a support ticket is prepared and the support ticket is raised (514). In some examples, the content for the support ticket can include, without limitation, the error code, the resolution identified, and the particular code that the resolution was to be applied to. In some examples, raising of the support ticket includes transmitting data representative of the support ticket to one or more administrators tasked with manual (or partially manual) resolution of the underlying issue. If the resolution was successfully applied, a status to update and report is prepared (516). For example, if the resolution was successfully applied, the status can indicate resolution of the error and details (e.g., which resolution was applied and when). If the resolution was not successfully applied, the status can indicate that the error is unresolved and provide other details (e.g., which resolution was attempted, but failed). Systems across the platform are updated (518). Updating of the systems can be referred to as backfilling. For example, a frequency count for the resolution can be incremented, if the resolution was successful. If the resolution that was applied is new (e.g., had not been previously used, the backfill process is performed to update the FEMA/TSG and inform other systems of the availability of the resolution for the respective error, as described in further detail herein. Further, if the resolution failed, the systems can be correspondingly updated.

In some implementations, a resolution can be automatically executed (i.e., without human intervention). In some implementations, a resolution can be partially automated (e.g., one or more tasks for resolution being automatically executed without human intervention). In some implementations, a resolution can be manually executed based on one or more tasks dictated to a user. For example, for manual execution of a resolution, one or more tasks that are to be executed can be displayed to a user in a UI. In this manner, the user is provided with instructions on actions to perform to resolve an issue.

Example errors can corresponding resolutions are provided in Table 1:

TABLE 1

Example Errors and Resolutions

| Error | Resolution |
| --- | --- |
| Log mode LEGACY | Reconfigure the log mode of system to "normal". In the "persistence" section of the global.ini configuration file, set the parameter "log_mode" to "normal" for the System layer. When changing the log mode, restart the database system to activate the changes. Also recommended to perform a full data backup. |
| Log mode OVERWRITE | Reconfigure the log mode of system to "normal". In the "persistence" section of the global.ini configuration file, set the parameter "log_mode" to "normal" for the System layer. When changing the log mode, restart the database system to activate the changes. Also recommended to perform a full data backup. |
| Existence of data backup | Perform data backup. |
| Status of most recent data backup | Determine why last data backup failed, resolve the problem, and perform a new data backup as soon as possible. |
| Age of most recent data backup | Perform a new data backup as soon as possible. |
| Identifies long-running savepoint operations. | Check disk I/O performance. |

In some implementations, backfilling includes updating the platform to account for application of a resolution, whether successful or unsuccessful. In short, backfilling updates various platform systems to account for and reflect the applied resolution. In some examples, the backfilling module 260 of FIG. 2 executes at least a portion of the backfilling process. For example, status data is received after application of the resolution. In some examples, the status data includes, without limitation, data representative of the error, the component suffering from the error (e.g., software, hardware), the applied resolution (e.g., particular patch), whether the resolution was successful/unsuccessful, and support ticket data (e.g., time of issuance, recipient(s) support ticket sent to, etc.), if the resolution was unsuccessful.

In some examples, the FEMA/TSG is updated to account for application of the resolution. In some examples, updating can include adding or updating resolution data associated with the resolution, which data can include, without limitation, a frequency (e.g., incrementing the frequency), the time/date when the resolution was successfully applied (e.g., last successful application of resolution), and the like. In some examples, if the resolution is new (i.e., had not been previously applied) the FEMA/TSG is updated to add the resolution (e.g., whether successful or unsuccessful). For example, resolution data can be added and can include, without limitation, an identifier of the resolution (e.g., name, unique identifier), a frequency (e.g., equal to 1)), the time/date when the resolution was successfully applied (e.g., last successful application of resolution), and the like.

In some examples, one or more other systems are informed of the resolution. For example, a notice can be transmitted to one or more administrators indicating that the resolution has been added to or updated within the FEMA/TSG, and can provide relevant details (e.g., at least a portion of the resolution data associated with the resolution). In this manner, the overall knowledge retained in the system and knowledge of users of the system (e.g., administrators) is updated.

In some implementations, learning includes one or more learning algorithms (e.g., one or more machine-learning (ML) models) that process instances of resolution application (e.g., whether successful) to provide information that can be used to improve future instances of resolution application and/or overall performance of the in-memory system. In some examples, the learning module 262 of FIG. 2 executes at least a portion of the learning process In some examples, learning can be performed to determine best-fit resolutions for respective errors. For example, a learning algorithm (e.g., ML model) can process resolution data for multiple resolutions across multiple errors to identify, which resolution works best in resolving a respective error. By way of non-limiting example, the resolution data can indicate that a first resolution and a second resolution were each applied multiple times to resolve errors. In this example, resolution data can indicate that the first resolution was applied X number of times and was successful Y number of times (where Y≤X), and, for each application, a resolution time can be provided (e.g., $t_{RT\_X}=\{t_1, t_2, \ldots, t_X\}$). In some examples, each resolution time is the time required from application of the resolution to resolution of the error or issuance of a support ticket (e.g., if resolution does not resolve error). Also in this example, resolution data can indicate that the second resolution was applied W number of times and was successful Z number of times (where Z≤W), and, for each application, a resolution time can be provided (e.g., $t_{RT\_X}=\{t_1, t_2, \ldots, t_W\}$). The learning algorithm can receive the resolution data for each of the first resolution and the second resolution as input and provide a score (e.g., within a range of 0 to 1) for each of the first resolution and the second resolution, the score indicating a performance of the respective resolution with respect to the particular error. By way of non-limiting example, for the particular error, the first resolution can receive a score of 0.9 and the second resolution can receive a score of 0.85, which indicates that the first resolution performs better (e.g., is more often successful and/or has lowest resolution time) than the second resolution for the particular error. In this manner, in response to future occurrences of the error, the first resolution can be attempted at the outset.

In some examples, the learning algorithm(s) can process instances of errors and resolutions to identify the top-k issues and/or the bottom-k issues (e.g., top-10, bottom-10), and periodically re-rank issues. In this manner, administrators can be aware of issues requiring more attention or less attention and apply changes to the in-memory system to proactively address the issues. For example, although an error is not triggered in a particular instance of the in-memory system, a patch can be proactively applied to avoid triggering of the error in the future.

In some implementations, the learning algorithm(s) can process resolution data and/or support ticket data to improve application of resolutions in future occurrences of an error. For example, and as described here, if a resolution does not work at first (e.g., multiple attempts are tried before success, or no success and a support ticket is issued for manual resolution), the learning algorithm can determine why success was not initially achieved and use this information to improve application of the resolution in the future. By way of non-limiting example, the resolution data can reveal that a resolution was attempted multiple times without success and a support ticket was issued, and the support ticket data can reveal that values for one or more parameters were not set, the administrator setting values for the one or more parameters, resulting in successful application of the resolution. For future application of the resolution, the platform can automatically set values of the parameters to achieve quick, successful application of the resolution and avoid triggering a support ticket.

In some implementations, the learning algorithm(s) process support ticket data to track support tickets and identify resolutions applied by administrators in resolving errors. In some examples, resolutions applied through the support ticket process can be integrated into the platform for future automated application. For example, for a particular resolution, the learning algorithm(s) can identify one or more errors that the resolution was applied to and can integrate the resolution into the platform, such that upon a future occurrence of the error(s), the resolution can be automatically applied to resolve the error(s) and avoid issuance of a support ticket.

In some implementations, the learning algorithm(s) can process error data (e.g., error codes, descriptions) to cluster similar error codes. In some examples, one or more resolutions can be associated with a cluster, such that, if an error occurs and is in a cluster, a resolution associated with the cluster can be applied. In this manner, in instances where an error does not already have a resolution associated therewith, a resolution associated with a similar error can be attempted on the error. This can avoid the need to issue a support ticket for manual intervention.

In some examples, clustering can be performed using any appropriate clustering technique. An example clustering technique includes k-means clustering. In some examples, clustering is executed based on one or more parameters. Example parameters include, without limitation, component type, functional area, severity, and priority.

In some implementations, the learning algorithm(s) can process error data and resolution data to identify areas within the in-memory system (e.g., backup, recovery, monitoring) that require more attention. These can include areas that see errors more frequently than other areas. In this manner, vulnerable areas can be identified, and administrators can look into and make more stable and/or proactively address issues.

In some examples, metrics collected on an error and turn-around in resolving the error are graphically represented in a dashboard displayed within a UI. In some examples, ranking can be provided based on the component, the functional area with the sub-category level and with the historical comparison of trend. This information is shared to development for analysis and proactive development fixes on the upcoming release to avoid the defects in future. This monitoring is a continuous process.

In some implementations, improvising includes various tasks that can be executed to provide efficiencies in the platform and/or improve resolution availability and application. In some examples, the improvising module 264 of FIG. 2 executes at least a portion of the improvising process.

In some examples, improvising can include de-duplication of resolutions within the platform. For example, de-duplication can be performed by periodically identifying similar resolutions on different errors on specific components. In some examples, the least applied fixes based on occurrences are revisited and merged with the popular fixes to avoid duplicated ineffective fixes in a fault tree.

In some examples, improvising can include identifying alternative or substitute resolutions for an error (e.g., from resolutions provided in the FEMA/TSG). Although multiple error codes are different, the underlying errors can be sufficiently similar that a resolution for one error can also be applied to resolve another error (e.g., an error that does not have a resolution indicated in FEMA/TSG, an error that has a resolution indicated, but the resolution is less efficient than desired). In some examples, and as described above with reference to learning, errors can be clustered, such that errors that are determined to be sufficiently similar are included in the same cluster. In some examples, each cluster can be associated with a set of resolutions, each resolution in the set of resolutions being applicable to any error in the cluster. In some examples, the set of resolutions includes resolutions that are associated with errors included in the cluster. In some examples, errors included in the cluster can be associated with the same resolution. Consequently, resolutions can be de-duplicated within the set of resolutions. In some examples, if an error occurs and the error is included in a cluster, resolutions in the set of resolutions can be evaluated and a resolution can be selected for application. In some examples, selection of the resolution can be based on resolution time (e.g., the resolution having the shortest resolution time is selected), resolution resources (e.g., the resolution that consumes the least amount of computing resources to implement), and/or resolution efficacy (e.g., the resolution that has the greatest chance of success in resolving the error).

In some examples, improvising can include product improvement recommendations. For example, and as described above with reference to learning, one or more areas within the in-memory system can be identified as vulnerable areas (e.g., areas that more frequently see errors than other areas). In some examples, learning can also provide underlying reasons for the errors. Accordingly, the platform of the present disclosure can issue notifications (e.g., to administrators) that identify vulnerable areas and underlying reasons, which notifications can be considered during product development. For example, during the product cycle foe a next iteration of one or more software modules within the in-memory system, the notifications can be taken into account by developers to mitigate occurrence of errors in subsequent releases.

In some examples, improvising can include proactive recommendations to avoid occurrences of errors. For example, occurrence of an error can result in a cascading effect (e.g., one error leads to another error). Such cascading can be determined from learning, discussed above, to identify errors that are interconnected. In some examples, if a first error occurs and is connected to a second error, an alert can be generated, such that the second error can be avoided (e.g., a resolution can be proactively implemented before the second error occurs).

In some examples, improvising can include providing notifications of expected resolution times for resolving respective errors. For example, and as discussed above with reference to learning, resolution times can be determined for errors. In some examples, an estimated resolution time for each error can be provided (e.g., as an average of resolution times across multiple applications of the resolution for the error). In some examples, improvising can include reclassification of severities of respective errors based on respective resolution times. For example, errors can be ranked in terms of severity. In some examples, severity can be based on one or more characteristics of the error. Example characteristics can include, without limitation, a downtime resulting from the error, an amount of computing resources impacted by the error, a number of systems affected by the error, and the like. In some examples, a severity score can be determined (e.g., ranging from 0 to 1). In some implementations, a severity score of an error can be adjusted based on the resolution time associated with the error. For example, a weight can be determined based on the resolution time and can be applied to the severity value. The higher the resolution time, the higher the weight. For example, for relatively low resolution times the weight can be less than 1, but greater than 0, and for relatively high resolution times, the weight can be greater than 1, but less than some maximum value (e.g., 1.5).

In some examples, improvising can include triggering follow-ups for unresolved support tickets. For example, the platform can trace support tickets that have been issued until resolution. In some examples, if a support ticket is not addressed within a particular period of time (e.g., 24 hours), a notification is sent to one or more administrators. In this manner, support tickets can be periodically brought to the attention of administrators to promote resolution of the underlying error and learning from the resolution that was applied.

In some implementations, reporting includes various tasks for, without limitation, reporting occurrences of errors, automated resolution of errors by the platform, support tickets issued by the platform, recommendations issued by the platform (e.g., vulnerable areas and underlying issues to address in future product development), updating of the platform (e.g., adding a resolution to FEMA/TSG, updating a resolution within FEMA/TSG), and the like. In some examples, the reporting module 266 of FIG. 2 executes at least a portion of the reporting, as described herein.

Figure 6:
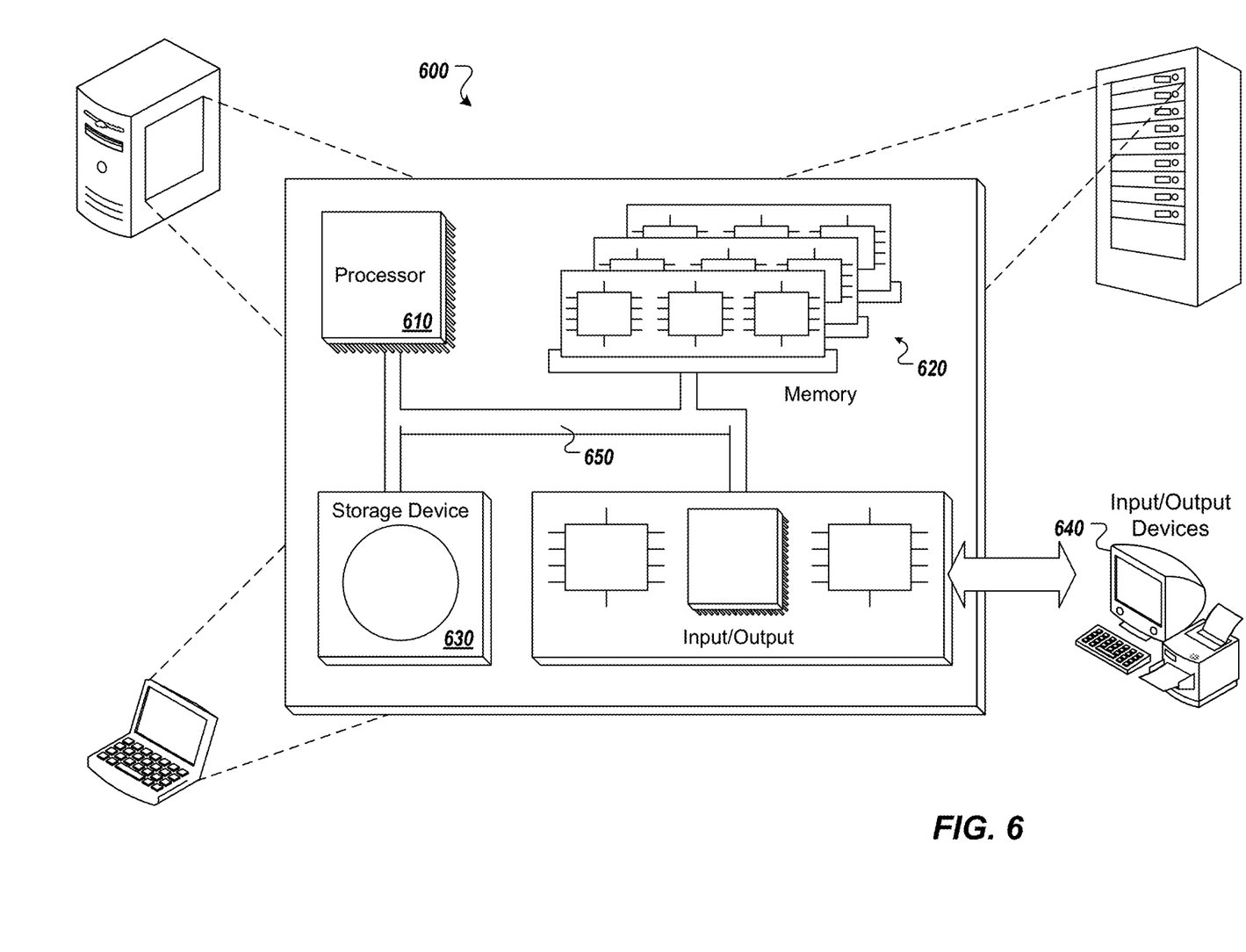
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing an auto-pilot platform for automated monitoring and resolution of errors in in-memory systems, the method being executed by one or more processors and comprising:
   receiving, by the auto-pilot platform, one or more log files from an in-memory system;
   determining, by the auto-pilot platform, occurrence of a first error within the in-memory system based on the one or more logs, wherein the first error is indicated by a first error code within the one or more log files;
   identifying, by the auto-pilot platform, a first resolution from a resolution repository based on the first error code, the resolution repository comprising one or more mappings associating error codes to resolutions including associating the first error code with the first resolution;
   initiating, by the auto-pilot platform, execution of the first resolution; and
   updating, by the auto-pilot platform and in response to the first resolution successfully resolving the first error, the resolution repository based on execution of the first resolution, updating at least partially comprising incrementing a frequency representing a number of times the first resolution has resolved errors.

2. The method of claim 1, wherein determining, by the auto-pilot platform, occurrence of a first error within the in-memory system based on the one or more logs comprises cross-referencing the first error code with a list of error codes and determining that the first error code is included in the list of error codes.

3. The method of claim 1, wherein the one or more mappings are provided in a configuration read by the auto-pilot platform.

4. The method of claim 1, wherein the first resolution is identified from a plurality of resolutions as a best-fit resolution for the first error in response to determining one or more of: the frequency associated with the first resolution being greater than frequencies of one or more other resolutions in the plurality of resolutions, and a last execution time of the first resolution being more recent than respective last execution times of the one or more other resolutions in the plurality of resolutions.

5. The method of claim 1, further comprising:
   determining, by the auto-pilot platform, occurrence of a second error within the in-memory system based on the one or more logs, wherein the second error is indicated by a second error code within the one or more log files;
   identifying, by the auto-pilot platform, a second resolution from the resolution repository based on the second error code;
   initiating, by the auto-pilot platform, execution of the second resolution; and
   determining, by the auto-pilot platform, that the second resolution is unsuccessful, and in response, initiating a support ticket for manual intervention in resolving the second error.

6. The method of claim 5, further comprising updating the resolution repository to include a third resolution, the third resolution being executed to resolve the second issue in response to the support ticket.

7. The method of claim 1, wherein the in-memory system comprises an in-memory database system.

8. A non-transitory computer-readable storage medium coupled to one or more processors and having instructions stored thereon which, when executed by the one or more processors, cause the one or more processors to perform operations for providing an auto-pilot platform for automated monitoring and resolution of errors in in-memory systems, the operations comprising:
   receiving, by the auto-pilot platform, one or more log files from an in-memory system;
   determining, by the auto-pilot platform, occurrence of a first error within the in-memory system based on the one or more logs, wherein the first error is indicated by a first error code within the one or more log files;
   identifying, by the auto-pilot platform, a first resolution from a resolution repository based on the first error code, the resolution repository comprising one or more mappings associating error codes to resolutions including associating the first error code with the first resolution;
   initiating, by the auto-pilot platform, execution of the first resolution; and
   updating, by the auto-pilot platform and in response to the first resolution successfully resolving the first error, the resolution repository based on execution of the first resolution, updating at least partially comprising incrementing a frequency representing a number of times the first resolution has resolved errors.

9. The computer-readable storage medium of claim 8, wherein determining, by the auto-pilot platform, occurrence of a first error within the in-memory system based on the one or more logs comprises cross-referencing the first error code with a list of error codes and determining that the first error code is included in the list of error codes.

10. The computer-readable storage medium of claim 8, wherein the one or more mappings are provided in a configuration read by the auto-pilot platform.

11. The computer-readable storage medium of claim 8, wherein the first resolution is identified from a plurality of resolutions as a best-fit resolution for the first error in response to determining one or more of: the frequency associated with the first resolution being greater than frequencies of one or more other resolutions in the plurality of resolutions, and a last execution time of the first resolution being more recent than respective last execution times of the one or more other resolutions in the plurality of resolutions.

12. The computer-readable storage medium of claim 8, wherein operations further comprise:
   determining, by the auto-pilot platform, occurrence of a second error within the in-memory system based on the one or more logs, wherein the second error is indicated by a second error code within the one or more log files;

identifying, by the auto-pilot platform, a second resolution from the resolution repository based on the second error code;

initiating, by the auto-pilot platform, execution of the second resolution; and determining, by the auto-pilot platform, that the second resolution is unsuccessful, and in response, initiating a support ticket for manual intervention in resolving the second error.

13. The computer-readable storage medium of claim 12, wherein operations further comprise updating the resolution repository to include a third resolution, the third resolution being executed to resolve the second issue in response to the support ticket.

14. The computer-readable storage medium of claim 8, wherein the in-memory system comprises an in-memory database system.

15. A system, comprising:
a computing device; and
a computer-readable storage device coupled to the computing device and having instructions stored thereon which, when executed by the computing device, cause the computing device to perform operations for providing an auto-pilot platform for automated monitoring and resolution of errors in in-memory systems, the operations comprising:
receiving, by the auto-pilot platform, one or more log files from an in-memory system;
determining, by the auto-pilot platform, occurrence of a first error within the in-memory system based on the one or more logs, wherein the first error is indicated by a first error code within the one or more log files;
identifying, by the auto-pilot platform, a first resolution from a resolution repository based on the first error code, the resolution repository comprising one or more mappings associating error codes to resolutions including associating the first error code with the first resolution;
initiating, by the auto-pilot platform, execution of the first resolution; and
updating, by the auto-pilot platform and in response to the first resolution successfully resolving the first error, the resolution repository based on execution of the first resolution, updating at least partially comprising incrementing a frequency representing a number of times the first resolution has resolved errors.

16. The system of claim 15, wherein determining, by the auto-pilot platform, occurrence of a first error within the in-memory system based on the one or more logs comprises cross-referencing the first error code with a list of error codes and determining that the first error code is included in the list of error codes.

17. The system of claim 15, wherein the one or more mappings are provided in a configuration read by the auto-pilot platform.

18. The system of claim 15, wherein the first resolution is identified from a plurality of resolutions as a best-fit resolution for the first error in response to determining one or more of: the frequency associated with the first resolution being greater than frequencies of one or more other resolutions in the plurality of resolutions, and a last execution time of the first resolution being more recent than respective last execution times of the one or more other resolutions in the plurality of resolutions.

19. The system of claim 15, wherein operations further comprise:
determining, by the auto-pilot platform, occurrence of a second error within the in-memory system based on the one or more logs, wherein the second error is indicated by a second error code within the one or more log files;
identifying, by the auto-pilot platform, a second resolution from the resolution repository based on the second error code;
initiating, by the auto-pilot platform, execution of the second resolution; and
determining, by the auto-pilot platform, that the second resolution is unsuccessful, and in response, initiating a support ticket for manual intervention in resolving the second error.

20. The system of claim 19, wherein operations further comprise updating the resolution repository to include a third resolution, the third resolution being executed to resolve the second issue in response to the support ticket.

\* \* \* \* \*